(12) United States Patent
Wang et al.

(10) Patent No.: US 10,178,477 B2
(45) Date of Patent: Jan. 8, 2019

(54) VIBRATING DIAPHRAGM ASSEMBLY

(71) Applicant: Goertek.Inc, Shandong (CN)

(72) Inventors: Hairong Wang, Shandong (CN);
Lianwen Shan, Shandong (CN);
Xinfeng Yang, Shandong (CN)

(73) Assignee: Goertek Inc., Weifang, Shandong (CN)

( * ) Notice: Subject to any disclaimer, the term of this patent is extended or adjusted under 35 U.S.C. 154(b) by 0 days.

(21) Appl. No.: 15/540,202

(22) PCT Filed: Nov. 13, 2015

(86) PCT No.: PCT/CN2015/094516
§ 371 (c)(1),
(2) Date: Jun. 27, 2017

(87) PCT Pub. No.: WO2016/150173
PCT Pub. Date: Sep. 29, 2016

(65) Prior Publication Data
US 2017/0374468 A1 Dec. 28, 2017

(30) Foreign Application Priority Data
Mar. 24, 2015 (CN) .......................... 2015 1 0131459

(51) Int. Cl.
*H04R 7/06* (2006.01)
*B29C 45/14* (2006.01)
(Continued)

(52) U.S. Cl.
CPC ............... *H04R 7/06* (2013.01); *B29C 45/14* (2013.01); *G10K 13/00* (2013.01); *H04R 7/10* (2013.01);
(Continued)

(58) Field of Classification Search
CPC ...... B29C 45/14; B32B 15/088; G10K 13/00; H04R 7/06; H04R 7/16; H04R 7/125; H04R 9/06; H04R 2307/025
See application file for complete search history.

(56) References Cited

U.S. PATENT DOCUMENTS

| 6,097,829 | A | 8/2000 | Guenther et al. | |
|---|---|---|---|---|
| 9,049,511 | B2 * | 6/2015 | Shen | ........................ H04R 7/10 |
| 2007/0286448 | A1 * | 12/2007 | Sato | ........................ H04R 7/125 |
| | | | | 381/424 |
| 2014/0087132 | A1 | 3/2014 | Huang et al. | |

FOREIGN PATENT DOCUMENTS

| CN | 201528420 U | 7/2010 |
|---|---|---|
| CN | 202873039 U | 4/2013 |

(Continued)

OTHER PUBLICATIONS

Translation of Chinese Patent Application No. CN201528420, p. 1 Drawings, pp. 2-4 Description.*

(Continued)

*Primary Examiner* — Brian Ensey
(74) *Attorney, Agent, or Firm* — Alston & Bird LLP

(57) ABSTRACT

A vibrating diaphragm assembly related to the technical field of electroacoustic products is provided. The vibrating diaphragm assembly comprises a vibrating diaphragm, wherein the vibrating diaphragm comprises a middle part and a folding ring part surrounding the periphery of the middle part. The vibrating diaphragm also comprises a vibrating diaphragm substrate layer and a silica gel layer; the silica gel layer being at least partially combined with the vibrating diaphragm substrate layer. The vibrating diaphragm substrate layer is also a high molecular material layer; the silica gel layer is combined on the surface of the folding ring part; and the silica gel layer and the high molecular material layer are formed through injection molding.

9 Claims, 4 Drawing Sheets

(51) Int. Cl.
  *G10K 13/00* (2006.01)
  *H04R 7/12* (2006.01)
  *H04R 7/16* (2006.01)
  *H04R 9/06* (2006.01)
  *H04R 7/10* (2006.01)
  *B32B 15/088* (2006.01)
  *B29C 45/16* (2006.01)
  *B29L 31/38* (2006.01)

(52) U.S. Cl.
  CPC ............... *H04R 7/125* (2013.01); *H04R 7/16* (2013.01); *H04R 9/06* (2013.01); *B29C 45/16* (2013.01); *B29L 2031/38* (2013.01); *B32B 15/088* (2013.01); *H04R 2307/025* (2013.01); *H04R 2307/204* (2013.01); *H04R 2307/207* (2013.01)

(56) References Cited

FOREIGN PATENT DOCUMENTS

| | | |
|---|---|---|
| CN | 203193869 U | 9/2013 |
| CN | 104754472 A | 7/2015 |
| CN | 204539450 U | 8/2015 |

OTHER PUBLICATIONS

Translation of Chinese Patent Application No. CN002459842, Abstract, 2 pages.*

International Searching Authority, International Search Report (ISR) and Written Opinion for International Application No. PCT/CN2015/094516, dated Feb. 5, 2016, 9 pages, State Intellectual Property Office of the P.R.C., China.

* cited by examiner

VIBRATING DIAPHRAGM ASSEMBLY

CROSS REFERENCE TO RELATED APPLICATIONS

This application is a national stage application, filed under 35 U.S.C. § 371, of International Application No. PCT/CN2015/094516, filed Nov. 13, 2015, which claims priority to Chinese Application No. 201510131459.X, filed Mar. 24, 2015, the contents of both of which as are hereby incorporated by reference in their entirety.

BACKGROUND

The present disclosure relates to the field of electroacoustics, and more particularly, to a diaphragm assembly.

The diaphragm is an important part of a loudspeaker for implementing electro-acoustic energy conversion. With the continuous development of the information industry and electronic technology and the continuous deepening of the research on basic materials, people have made many attempts and explorations in this technical field of diaphragm materials, so as to make product's performances more optimized.

In an existing loudspeaker, the diaphragm structure is mainly composed of a single-layer polymer material, such as polyethylene terephthalate (PET), polyethylene naphthalate (PEN), polyether ether ketone (PEEK), polyetherimide (PEI), polyphenylene sulfide (PPS), polyarylate (PAR), thermoplastic polyurethane elastomer (TPU), etc. There are also some diaphragms being of composite structures including two or more of the materials described above, but the diaphragms composed of the materials described above generally have the problems such as poor strength and uniformity. Specifically, the diaphragm composed of the single-layer polymer material is more difficult in molding and processing, while the composite diaphragm composed of multiple layers of polymer material as mentioned in the above is not uniform in molding uniformity and prone to affect the product's acoustic performances. In addition, the diaphragm composed of the polymer material is difficult to have relatively good strength and toughness at the same time, prone to rupture and other phenomena, and not ideal in compliance; moreover, the diaphragm composed of the polymer material after long-term working will undergo temperature changes, and the diaphragm having poor temperature stability is prone to deformation and softening, thus affecting product's quality and service life.

Therefore, it is necessary to propose a new improved solution for the material composition of the diaphragm structure against the problems described above, in order to further improve the temperature stability, compliance and other indexes of the diaphragm.

BRIEF SUMMARY

The technical problem to be solved by embodiments of the present invention is to provide a diaphragm assembly having better compliance, wider adaptability to temperature and stronger chemical stability.

In order to fulfill said purpose, embodiments of the present invention adopt the following technical solution: a diaphragm assembly, comprising a diaphragm, wherein the diaphragm comprises a middle portion and a surround portion which encircles a periphery of the middle portion; the diaphragm comprises a diaphragm base layer and a silica gel layer, wherein the silica gel layer is at least partially integrated to the diaphragm base layer; the diaphragm base layer is a polymer material layer; the silica gel layer is integrated to the surface of the surround portion; the silica gel layer and the polymer material layer are formed by injection molding.

As an improvement, the silica gel layer is liquid silica gel.

As an improvement, the diaphragm assembly further comprises a reinforcing portion arranged in the middle of the diaphragm; the reinforcing portion is integrated to an upper side/lower side of the middle portion; the middle portion is the diaphragm base layer or a composite structure of the diaphragm base layer and the silica gel layer.

As an improvement, the silica gel layer is integrated to an upper side surface and/or a lower side surface of the surround portion.

As an improvement, the surround portion is of a shape of a racetrack, including two long shaft portions and arc-shaped portions connecting the two long shaft portions; the silica gel layer is integrated to a surface of the long shaft portions and/or the arc-shaped portions.

As an improvement, the diaphragm base layer is a single polymer material layer or multiple polymer material layers.

As an improvement, the diaphragm base layer is a single polymer material layer; the single polymer material layer is composed of any one selected from a group including polyethylene terephthalate, polyethylene naphthalate, polyether ether ketone, polyetherimide, polyphenylene sulfide, polyarylate and thermoplastic polyurethane elastomer.

As an improvement, the diaphragm base layer is multiple polymer material layers; the multiple polymer material layers are composed of any two or more selected from a group including polyethylene terephthalate, polyethylene naphthalate, polyether ether ketone, polyetherimide, polyphenylene sulfide, polyarylate and thermoplastic polyurethane elastomer.

As an improvement, an adhesive layer for adhesively fixing two adjacent polymer material layers is arranged between the multiple polymer material layers; the silica gel layer and the multiple polymer material layers are integrated by injection molding.

As an improvement, the polymer material layer has a thickness of 3-100 μm; the silica gel layer has a thickness of 20-200 μm.

After the technical solution described above is adopted, embodiments of the diaphragm assembly of the present invention have the beneficial effects:

According to embodiments of the diaphragm assembly of the present invention, the silica gel layer is integrated to the surface of the surround portion of the diaphragm and is integrated with the polymer material layer by injection molding. Since the silica gel material has a wider temperature adaptability range per se and has stronger temperature resistance, it is unlikely to deform in a working process and capable of overcoming the softening phenomenon of the surround portion owing to temperature change and improving the product's reliability yield; on the other hand, the silica gel material has better compliance, and the compliance of the surround portion can be effectively adjusted by integrating the silica gel layer to the surface of the surround portion of the diaphragm, thereby improving the phenomenon of the product's harmonic distortion and improving the product's listening yield; moreover, the silica gel material has good mechanical properties and strong elasticity, and can increase the vibration amplitude of the diaphragm to a certain extent.

Since the silica gel layer of embodiments of the diaphragm assembly of the present invention is liquid silica gel, which has good fluidity and fast vulcanization, it can be directly formed by injection molding with the polymer material layer to solve the problem of difficult molding of the traditional structure and simplify the molding process with ease of operation.

In view of the above, according to embodiments of the diaphragm assembly of the present invention, the design of the surface of the surround portion in integration with the silica gel layer is an effective method for improving the temperature adaptability, compliance and stability of the surround portion of the diaphragm, which can be promoted and applied in the single diaphragm base layer or the diaphragm base layer compounded by multiple layers of polymer material and in different types of electro-acoustic device structures.

The reference signs include: 1, diaphragm; 2, surround portion; 21, long shaft portion; 22, arc-shaped portion; 3, middle portion; 4, reinforcing portion; 5, diaphragm base layer; 5', diaphragm base layer; 6, silica gel layer; 7, polyether ether ketone material layer; 8, thermoplastic polyurethane elastomer material layer; 9, adhesive layer.

DETAILED DESCRIPTION OF VARIOUS EMBODIMENTS

Embodiments of the present invention will be described in detail with reference to the accompanying drawings:

Embodiment 1

Figure 1:
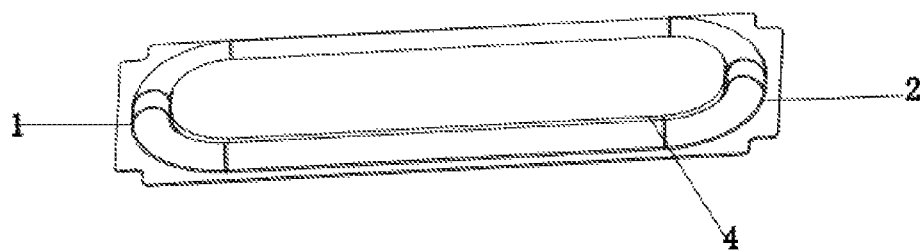
FIG. 1 is a structural schematic view of a diaphragm assembly of the present disclosure.
Figure 2:
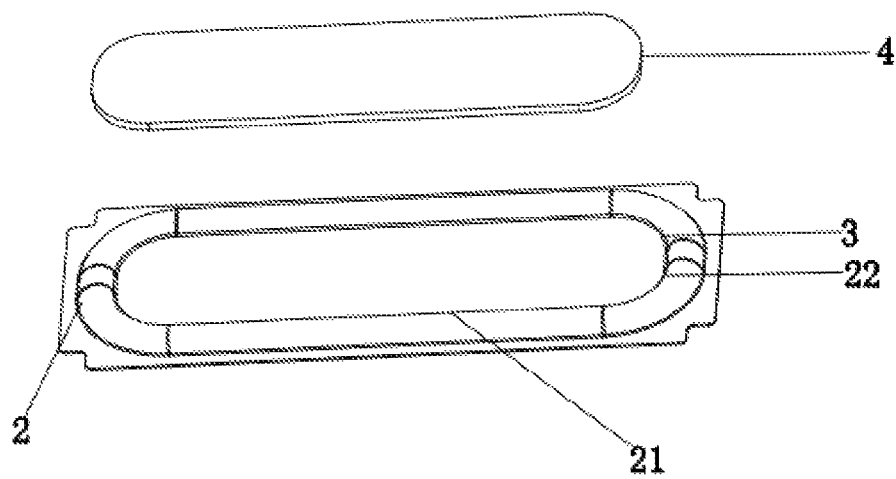
FIG. 2 is an exploded view of the diaphragm assembly of the present disclosure.
Figure 3:
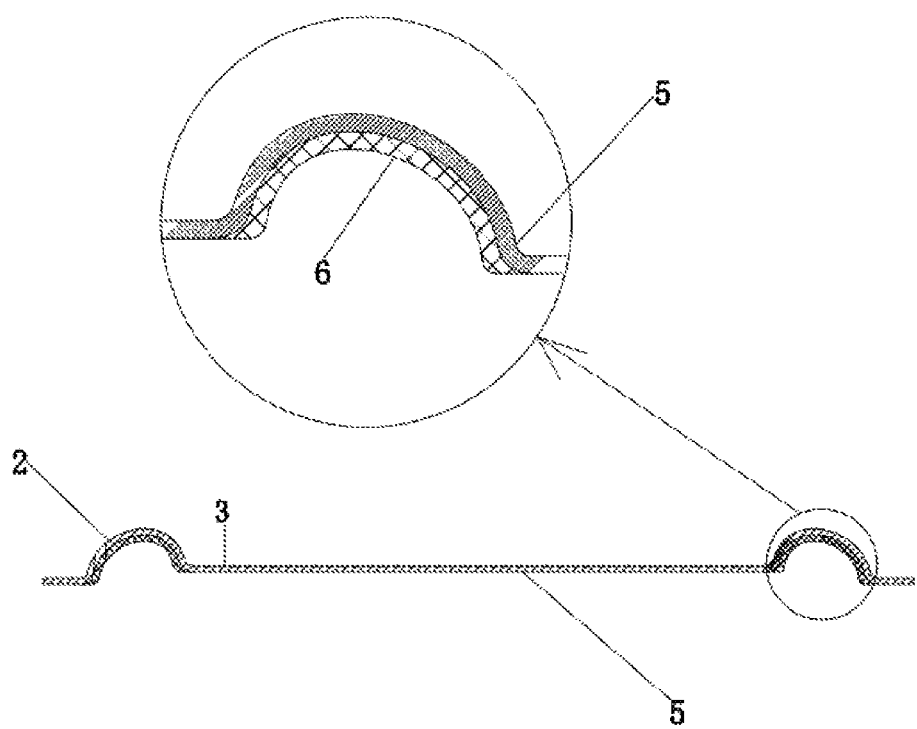
FIG. 3 is a sectional view of a diaphragm assembly structure according to embodiment 1 of the present disclosure.

FIGS. 1-3 illustrate a diaphragm assembly structure according to embodiment 1 of the present invention. In the present embodiment, a diaphragm base layer is a single polymer material layer, and a middle portion of a diaphragm is a diaphragm base layer.

As shown in FIGS. 1-3, the diaphragm assembly comprises a diaphragm 1, wherein the diaphragm 1 comprises a middle portion 3 and a surround portion 2 which encircles the periphery of the middle portion 3. The diaphragm assembly further comprises a reinforcing portion 4 arranged in the middle of the diaphragm 1. The reinforcing portion 4 is integrated to an upper side or a lower side of the middle portion 3 and is generally of a single-layer structure or multi-layer structure composed of polyether ether ketone (PEEK), thermoplastic polyurethane elastomer (TPU) or other polymer materials.

The diaphragm 1 comprises a diaphragm base layer 5 and a silica gel layer 6 integrated to the surface of the surround portion 2. The diaphragm base layer 5 is a single polymer material layer which may be specifically composed of any one selected from a group including polyethylene terephthalate (PET), polyethylene naphthalate (PEN), polyether ether ketone (PEEK), polyetherimide (PEI), polyphenylene sulfide (PPS), polyarylate (PAR) and thermoplastic polyurethane elastomer (TPU). The silica gel layer 6 is formed by injection molding with any of the polymer material layers described above. It should be noted that, in specific implementation, the diaphragm base layer is not limited to the materials described above, and other polymer materials may be selected as the diaphragm base layer 5.

In the present embodiment, the middle portion 3 is a diaphragm base layer 5, that is, the silica gel layer 6 is integrated to only the surface of the surround portion 2, and the middle portion 3 is still of a polymer material layer structure.

Preferably, the silica gel layer 6 is liquid silica gel which has relatively strong fluidity and can be directly formed by injection molding.

Preferably, the silica gel layer 4 is integrated to an upper side surface and/or a lower side surface of the surround portion 2, that is to say, in specific implementation, the silica gel layer 6 may be integrated to the upper side surface of the surround portion 2, or may be integrated to the lower side surface of the surround portion 2, or may be integrated to both the upper side surface and the lower side surface of the surround portion 2, all of which can achieve the effects of the technical solution.

In the present embodiment, the surround portion 2 is of a shape of a racetrack, including two long shaft portions 21 and arc-shaped portions 22 connecting the two long shaft portions. The silica gel layer 6 is integrated to a surface of the long shaft portions 21 and/or the arc-shaped portions 22. That is to say, the silica gel layer 6 may be integrated with the long shaft portions, or may be integrated with the arc-shaped portions 22, or may also be integrated with both the long shaft portions 21 and the arc-shaped portions 22, all of which can achieve the effects of the technical solution.

It should be noted that the technical solution is applicable not only to the racetrack-shaped surround portion structure as shown in the present embodiment, but also to a rectangular surround portion structure and other different shapes of the surround portion structures. For example, when the silica gel layer is integrated to the surface of the rectangular surround portion, the silica gel layer 6 may be also integrated to the upper side surface of the rectangular surround portion, or may be integrated to the lower side surface thereof, or may be integrated to both the upper side surface and the lower side surface. The silica gel layer 6 may be integrated with long shaft portions of the rectangular surround portions, or may be integrated with short shaft portions, or may be integrated with both the long shaft portions and the short shaft portions, all of which do not affect the implementation of the technical solution.

Preferably, the polymer material layer has a thickness of 3-100 μm; the silica gel layer has a thickness of 20-200 μm.

With the technical solution described above, after the silica gel layer 6 is integrated to the surface of the surround portion 2, the compliance of the diaphragm 1 is improved, and the adaptability to temperature and the chemical stability of the diaphragm 1 per se during working can be improved, which is simultaneously beneficial to increase the damping property of the surround portion and to effectively adjust the acoustic parameters, so as to optimize the product's acoustic performance.

Embodiment 2

Figure 4:
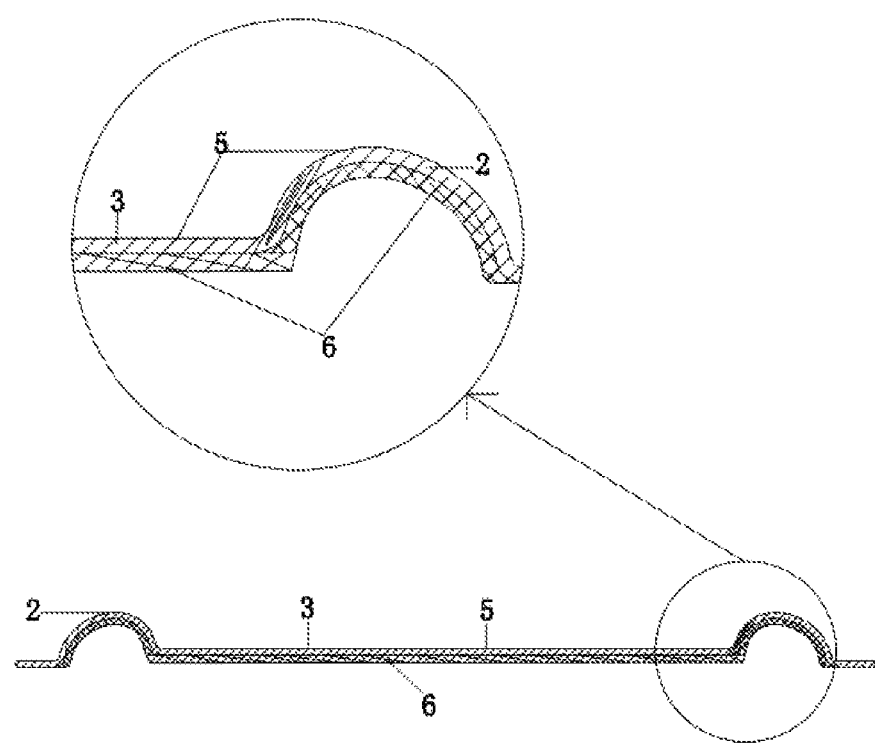
FIG. 4 is a sectional view of a diaphragm assembly structure according to embodiment 2 of the present disclosure.

FIG. 4 illustrates the second embodiment of the diaphragm of the present invention, which is basically the same as embodiment 1. The difference therebetween lies in that: the middle portion 3 of the diaphragm 1 is of a composite structure of the diaphragm base layer 5 and the silica gel layer 6, that is, the silica gel layer 6 is integrated to both the surfaces of the surround portion 2 and the middle portion 3 by injection molding.

Embodiment 3

Figure 5:
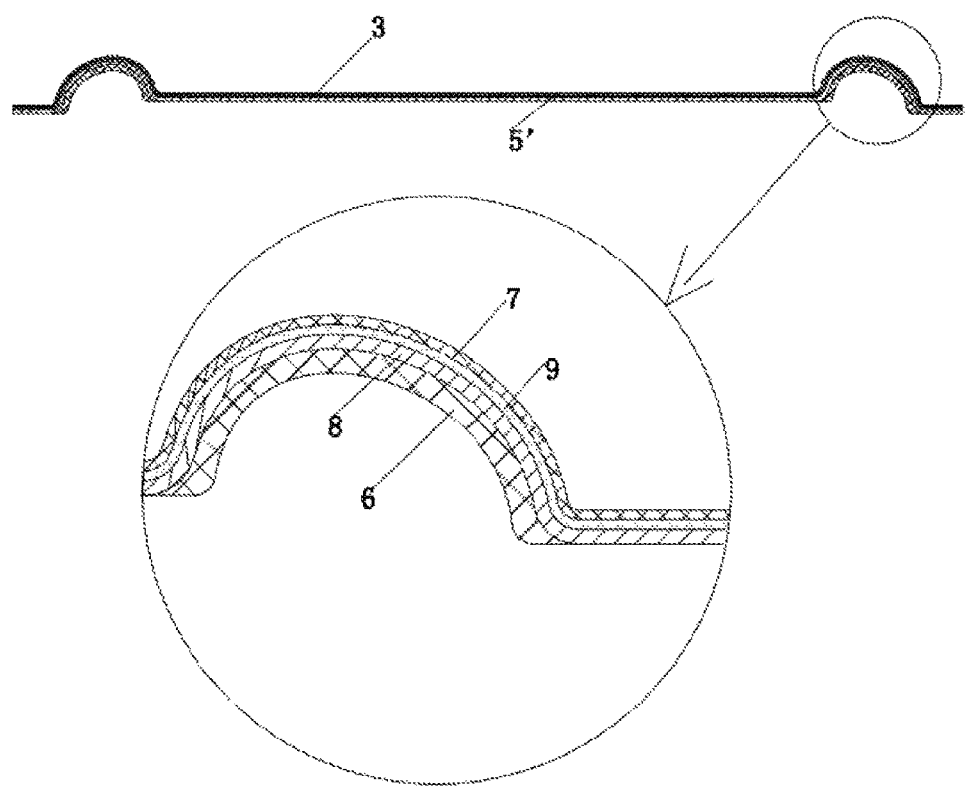
FIG. 5 is a sectional view of a diaphragm assembly structure according to embodiment 3 of the present disclosure.

FIG. 5 illustrates the third embodiment of the diaphragm of the present invention, which is basically the same as embodiment 1. The difference therebetween lies in that: the diaphragm base layer 5' is a two-layer polymer material layer, including a polyether ether ketone (PEEK) material layer 7 and a thermoplastic polyurethane elastomer (TPU) material layer 8. It should be pointed out that the polymer material layers are not limited to the two material layers described above, and may also be composed of any two materials selected from a group including polyethylene terephthalate (PET), polyethylene naphthalate (PEN), polyether ether ketone (PEEK), polyetherimide (PEI), polyphenylene sulfide (PPS), polyarylate (PAR), thermoplastic polyurethane elastomer (TPU). It should be noted that, in a specific implementation, the diaphragm base layer 5' is not limited to the materials described above, and other polymer materials may be used as the diaphragm base layer.

As shown in FIG. 5, an adhesive layer 9 is arranged between the polyether ether ketone layer 7 and the thermoplastic polyurethane elastomer material layer 8 and used for adhesively fixing the two polymer material layers. In the present embodiment, the silica gel layer 6 may be compounded with the polyether ether ketone material layer 7, or may be compounded with the thermoplastic polyurethane elastomer material layer 8, or may be compounded with both the polyether ether ketone material layer 7 and the thermoplastic polyurethane elastomer material layer 8.

It should be noted that the technical solution of the present disclosure can be applied not only to the diaphragm base layer compounded by the two polymer material layers described above, but also to a multilayer structure of two or more layers, wherein the multiple polymer material layers may be specifically composed of any number of polyethylene terephthalate (PET), polyethylene naphthalate (PEN), polyether ether ketone (PEEK), polyetherimide (PEI), polyether imide (PEI), Polyphenylene sulfide (PPS), polyarylate (PAR), thermoplastic polyurethane elastomer (TPU). Similarly, the multiple polymeric material layers are not limited to the materials described above, and in specific implementation, may be embodied in a variety of other polymer material layers. The adjacent polymer material layers are adhesively fixed by the adhesive layer 9, and the silica gel layer 6 is integrated with the multiple polymer material layers by injection molding.

What described above are only exemplary embodiments of the present invention, and are not intended to limit the present invention. Rather, any equivalent modifications or changes made by those of ordinary skill in the art according to the contents of the present invention shall all fall within the scope of the claims.

The invention claimed is:

1. A diaphragm assembly comprising:
 a diaphragm, wherein the diaphragm comprises:
  a middle portion;
  a surround portion that encircles a periphery of the middle portion,
  a diaphragm base layer;
  a reinforcing portion arranged in the middle portion of the diaphragm; and
  a silica gel layer,
 wherein:
  the silica gel layer is at least partially integrated to the diaphragm base layer;
  the diaphragm base layer is a polymer material layer;
  the silica gel layer is integrated to a surface of the surround portion;
  the silica gel layer and the polymer material layer are formed by injection molding;
  the reinforcing portion is integrated to one of an upper side or a lower side of the middle portion;
  the reinforcing portion is one of a single-layer structure or a multi-layer structure composed of polyether ether ketone or thermoplastic polyurethane elastomer; and
  the middle portion is one of the diaphragm base layer or a composite structure including the diaphragm base layer and the silica gel layer.

2. The diaphragm assembly according to claim 1, wherein the silica gel layer is liquid silica gel.

3. The diaphragm assembly according to claim 1, wherein the silica gel layer is integrated to at least one of an upper side surface or a lower side surface of the surround portion.

4. The diaphragm assembly according to claim 3, wherein:
 the surround portion is of a shape of a racetrack, including two long shaft portions and arc-shaped portions connecting the two long shaft portions, and
 the silica gel layer is integrated to a surface of at least one the long shaft portions or the arc-shaped portions.

5. The diaphragm assembly according to claim 1, wherein the diaphragm base layer is either a single polymer material layer or multiple polymer material layers.

6. The diaphragm assembly according to claim 5, wherein:
 the diaphragm base layer is a single polymer material layer, and
 the single polymer material layer is selected from a group consisting of: polyethylene terephthalate, polyethylene naphthalate, polyether ether ketone, polyetherimide, polyphenylene sulfide, polyarylate, or a thermoplastic polyurethane elastomer.

7. The diaphragm assembly according to claim 5, wherein:
 the diaphragm base layer is multiple polymer material layers, and
 the multiple polymer material layers are composed of any two or more of: polyethylene terephthalate, polyethylene naphthalate, polyether ether ketone, polyetherimide, polyphenylene sulfide, polyarylate, and/or a thermoplastic polyurethane elastomer.

8. The diaphragm assembly according to claim 7, wherein:
 an adhesive layer for adhesively fixing two adjacent polymer material layers is arranged between the multiple polymer material layers, and
 the silica gel layer and the multiple polymer material layers are integrated by injection molding.

9. The diaphragm assembly according to claim 1, wherein the polymer material layer has a thickness of 3-100 µm, and the silica gel layer has a thickness of 20-200 µm.

* * * * *